3,154,969

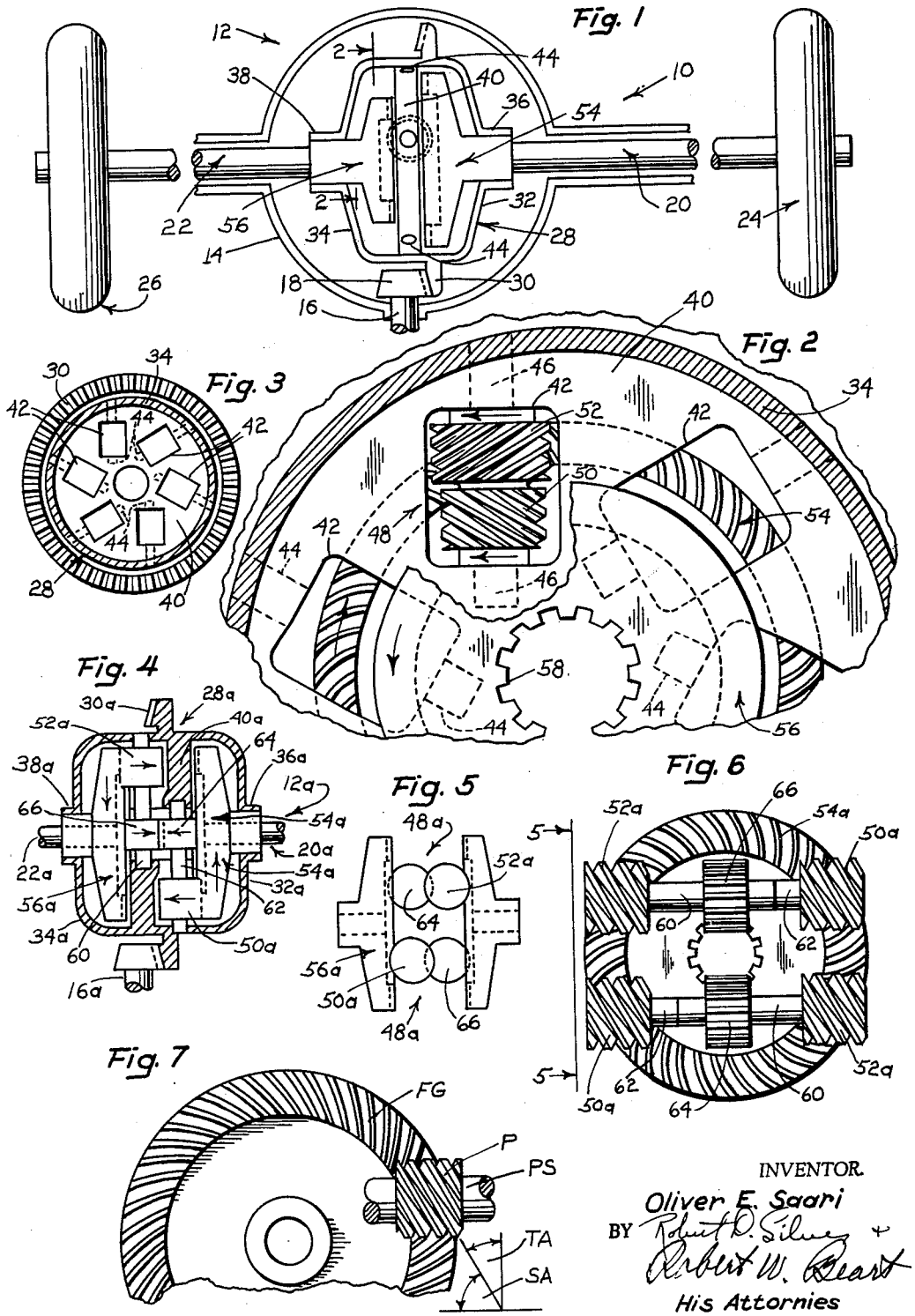

United States Patent Office 3,154,969
Patented Nov. 3, 1964

3,154,969
SEMI-LOCKING DIFFERENTIAL
Oliver E. Saari, Elmhurst, Ill., assignor to Illinois Tool
Works Inc., Chicago, Ill., a corporation of Delaware
Filed Apr. 30, 1963, Ser. No. 276,887
13 Claims. (Cl. 74—715)

This invention relates in general to differentials and more particularly relates to semi-locking differentials.

A familiar problem to automobile drivers is the situation where one rear driving wheel is located on ice or mud providing very poor traction while the other wheel is on dry ground or surface providing better traction. The wheel with the poor traction spins and the wheel with the good traction stands still. Various prior art devices for overcoming this problem have been suggested and some are in commercial usage. Among the prior art devices for providing a semi-locking differential or a selectively locking differential are various types of clutch mechanisms which come into play when a predetermined amount of relative motion occurs between the shafts which drives the automobile or other vehicle. These devices are generally cumbersome and involve a number of moving parts of relatively high cost. Further, devices of this nature have not found commercial acceptance in large construction type equipment such as front end loaders and the like. This obtains because the various devices provided heretofore have not had the requisite strength in the design parameters permitted for this environment.

As will be appreciated, it is necessary that moving vehicles having a single driving source to more than one wheel which must be able to go around corners, must permit a difference in the speeds of the driving members (wheels and the like) unless one wheel is going to skid. The difference in relative speeds of the two shafts on the driving wheels is relatively low during a cornering operation. However, when one wheel is on ice, mud or the like, and the other wheel has relatively good traction, the difference in motion of the two shafts may be of a relatively high order. A geared mechanism to provide this feature is generally called a differential.

It is a general object of this invention to provide a differential of the semi-locking type which will tend to impart a lessening of the relative motion between two shafts without disability to efficient transmission of power to the two shafts when the angular restraints thereon are substantially the same so that there is no relative motion therebetween.

Still another object of this invention is to provide a differential of the semi-locking type which is well adapted for heavy duty operational environments.

Still another object of this invention is to provide a semi-locking differential which is relatively compact, is relatively easy to manufacture, assemble and service and is otherwise well adapted for its intended purpose.

Still another object of this invention is to provide a semi-locking differential where the conjugate action between gear and pinion members is of a sliding nature so as to absorb power under a predetermined set of circumstances.

Still another object of this invention is to provide a differential of the semi-locking type wherein the meshing conjugate action of pinion and gear members is "inefficient" within a predetermined range of efficiencies determined by the spiral angle or thread angle of the pinion member.

A still further object of this invention is to provide a differential of the semi-locking variety wherein the efficiency of the differential may be selected from a wide range of efficiencies.

Still another object of this invention is to provide a differential of the type set forth above wherein the semi-locking action is provided solely by the meshing action of gears and pinions and whereby a relatively large amount of power may be transmitted through the device per unit size.

The novel features that are characteristic of the invention are set forth with particularity in the appended claims. The invention itself, both as to its organization and its method of operation together with additional objects and advantages thereof, will best be understood by the following description when read in connection with the accompanying drawings, in which:

FIG. 1 is a view, somewhat semidiagrammatic in nature, of the differential, axles and wheels of a vehicle;

FIG. 2 is an enlarged partial sectional view along lines 2—2 of FIG. 1;

FIG. 3 is a view similar to FIG. 2 on a somewhat smaller scale showing the relative relationship of the apertures in the carrier means;

FIG. 4 is a view somewhat similar to FIG. 1 showing an alternate embodiment of differential;

FIG. 5 is a semidiagrammatic view of the critical portions of the device depicted in FIG. 4 taken along lines 5—5 of FIG. 6;

FIG. 6 is a sectional view, semidiagrammatic in nature, showing the relative relationship of the pinions to gears and the coupling means therebetween; and FIG. 7 is a semidiagrammatic view of a pinion and face gear of the type shown in the foregoing figures of the drawings.

Returning now to FIG. 1 of the drawings, the driving assembly of a vehicle is illustrated generally by the reference numeral 10. A differential 12, as used in the rear axle of automobiles, trucks and tractors is essentially a gear box with a "gear ratio" of minus unity. The differential 12 is generally enclosed in a housing 14 which usually supports the power input means in the form of a drive shaft 16 and a bevel gear means 18 to give power to the shafts 20 and 22 which extend from opposite sides of the differential 12 to wheels such as 24 and 26. It will be obvious that the power input means may be of any suitable type such as, for example, belt drive means, electric motor means, etc.

The wheels such as 24 and 26 being at opposite sides of the vehicle must, of course, turn at different speeds when turning corners if both wheels are to maintain a rolling (non-skidding) relation to the ground, road surface, or the like. The differential 12 allows the wheels to do this even when they are driven from the same power source. The differential carrier means 28 is driven by the main power source for the vehicle, such as a motor and transmission through a ring gear portion 30 which is fixed to the carrier means 28 and forms a part thereof. The gear portion 30 is in meshing relationship to the power input means bevel gear 18. The axis of rotation of the carrier means 28 is coaxial with the axis of rotation of the two shafts 20 and 22.

The carrier means 28, in addition to mounting a ring gear portion 30, is here shown in semidiagrammatic form for mounting various spider members 32 and 34 which extend from opposite sides thereof to provide bearing mounts 36 and 38 for the respective shafts or axles 20 and 22. It will be realized that the bearings in application will be considerably more elaborate.

The exact form of the bearing portions 36 and 38 are not important to the explanation of the concepts involved other than it is necessary that the shafts or axles 20 and 22 be permitted to have relative rotation to each other and to the carrier means 28 and housing 14. The carrier means 28 also mounts a central plate 40 which is fixed to the spider portions 32 and 34. The carrier means 28 as a unit is mounted for rotation and plate 40 is located intermediate the end surfaces of the two shafts 20 and 22. The carrier plate 40, as shown in FIG. 3, is formed with a plurality of rectilinear apertures 42 which are symmetrically arranged around the axis of rotation of the plate. Bore means 44 are formed in plate 40 and traverse the apertures along the lines indicated by the reference numerals 44 in FIG. 3, it being noted that each of the lines 44 is in skew relationship to the axis of plate member 40.

Shaft means 46 are adapted to be fitted into each of the bores 44 to mount a pinion set 48 in each aperture 42. As can be perceived from FIGS. 2 and 3, there will be six sets 48 of pinions mounted in the six respective apertures, each set 48 comprising a first pinion 50 and a second pinion 52, each pinion 50 and 52 being fixed to a common shaft 46. The shaft 46, thus, is a coupling means for the individual pinions 50 and 52 and since the pinions 50 and 52 are coaxial and fixed to the same shaft, the planes of rotation of the pair of pinions are, of course, parallel to each other.

Each of the pinions 50 and 52 are generally cylindrical in form and each has a diameter greater than the thickness of the plate 40. It will be observed that pinion 52 is larger than pinion 50 and is disposed radially outboard of the axis of rotation of plate 40 as compared to pinion 50. Pinion 52 is disposed in meshing coaction with face gear 54 and pinion 50 is disposed in meshing coaction with face gear 56. Face gear 54 is of larger diameter than face gear 56 as can be discerned from FIGS. 1 and 2 and the relative relationship between the sizes of the pinions 50 and 52 and the sizes of gears 54 and 56 are such that pinion 52 coacts only with gear 54 and pinion 50 coacts only with gear 56, the coupling between the two gears being through the pinions 50 and 52 and their common shaft 46. It will be further observed that each of the apertures 42 serve to mount an identical pinion set 48 having pinions 50–52 mounted on shaft means 46 in each of the six locations shown in FIG. 3. Thus, the pinion sets are mounted for rotation on as well as for rotation with the carrier plate 40 and thus, carrier means 28.

Each of the two face gears 54 and 56 are mounted, by suitable splines such as 58, to the respective shafts 20 and 22. Thus, for normal driving activity, power is imparted to ring gear 30 from gear 18 causing rotation of plate 40 and when the angular restraints on the wheels 24 and 26 are substantially identical, assuming substantially identical friction in the bearings, etc., there will be no rotation of the individual pinions 50 and 52 on their axes since the loads imparted to the pinions 50 and 52 and their respective face gears 56 and 54 counterbalance each other. In the usual normal straightaway movement of both wheels 24 and 26, there will be no relative motion between the carrier ring gear 30 and the individual shafts 20 and 22 and the face gears mounted thereon. The pinions 50 and 52 will rotate with but not on the carrier plate 40. It will be further noted that the two gears 54 and 56 are of opposite hand as are the pinions 50 and 52. The reason for this will become more apparent hereinafter.

In FIG. 7 there is shown a partial plan view of a pinion P and pinion shaft PS cooperating with a face gear FG, the construction being generic to the pinion 50 cooperating with face gear 56 and the pinion 52 cooperating with the face gear 54. This gearing is of the type set forth in my Patent No. 2,954,704. Pinion P is cylindrical and the pinion shaft PS is disposed at right angles to and in non-intersecting (skew) relationship with the axis of the face gear FG. This gearing is particularly effective where there are limited space requirements. It will be noted that the lead on the pinion is constant and the teeth on the pinion are unsymmetrical, one side of the teeth having a low pressure angle selected between 0° and 20°, while the other side having a high pressure angle selected from 20° to 40°. The individual teeth are symmetrical about the limit pressure angle, said limit pressure angle being represented by a line passing through the projection of the pitch point of the pinion onto the circumference of the pinion on the side remote from the gear axis and in the axial plane of the pinion perpendicular to the gear axis, said limit pressure angle being perpendicular to the line in said pinion axial plane through said projection and through the projected intersection of the pinion axis with the axial plane of said gear perpendicular to said pinion axis. The lead of the pinion teeth is calculated in accordance with the formula $$L = \frac{2\pi C}{K - \frac{x}{y}}$$

wherein L equals the lead; C equals the distance on the common perpendicular between the axis of the gear and the pinion; K equals the speed ratio which equals the number of teeth in the gear over the number of teeth in the pinion; $x$ equals the distance along the axis of the pinion from the pitch point of the pinion to an axial plane of the gear perpendicular to the pinion axis; and $y$ equals the radius of the pinion. The face gear FG has a ring of concave-convex teeth, the spiral angle of the teeth on the gear being such that the radially outer portions of the gear teeth trail the radially inner portions with the gear rotated in the convex direction of the gear teeth.

In my patent aforementioned, it is taught that the spiral angle SA on the pinion may vary from slightly above 0° up to slightly below 90°. The converse situation applies to the thread angle TA. The instant application of the gearing to a differential of the semi-locking variety necessitates that the thread angle of the teeth on the pinion be in the range of 10° to 45°. The spiral angle range is complementary and would vary in the range of 80° to 45°. When the thread angle on the pinion exceeds 45° (or the spiral angle is below 45°) the contact between the pinion teeth and the gear teeth becomes mostly a rolling contact rather than a sliding action. The sliding action necessitates friction between the conjugate surfaces of the pinion and the gear and in a sense is a measure of the efficiency of the gearing. In the instant application, the requirements are for "inefficiency" in the conjugate action of the pinion teeth and the gear teeth so as to absorb power. This is the action that provides the semi-locking action desired in the instant differential.

The instant pinion teeth and gear teeth have a line contact completely across the face of the tooth. Substantially no fillets or undercuts are formed in the teeth and a film of oil is wiped along the gear and pinion to provide excellent lubrication. The line contact, from substantially the tip to root of the teeth is always present in a plurality of teeth. Thus, there is continuous action and no discontinuities. Further, the gearing is quite strong. The gears can be assembled for zero backlash operation, and as aforementioned, provide a compact assembly.

Turning again to the differential 12, and considering it as a gear box with a "gear ratio" of minus unity, then if W is the angular speed of the carrier means 28, and $W_1$ and $W_2$ are the wheel speeds of the wheels 24 and 26, then the differential 12 maintains the relationship:

$$\frac{W_1 - W}{W_2 - W} = -1 \qquad (1)$$

from this it is seen that:

$$W = \frac{W_1 + W_2}{2} \qquad (2)$$

This is a perfectly symmetrical relationship with respect to the wheel speeds of wheels 24 and 26, a necessary condition for uniform driving and turning characteristics of a vehicle.

If the differential carrier means 28 is held fixed ($W = 0$), then Equation 1 gives the formula $$\frac{W_1}{W_2} = -1$$

which implies that the differential 12 must be a 1:−1 gear box. Any kind of gear train having this ratio characteristic (and obviously, concentric input and output shaft) can be used as a differential.

If T is the torque applied by the ring gear 30 of the carrier means 28, $T_1$ and $T_2$ are the torques applied by the axle shafts 20 and 22 on the differential 12, then (if we ignore transient inertia forces), from equilibrium we must have $$T+T_1+T_2=0 \qquad (4)$$

Suppose E is the efficiency of the differential 12 as a gear train. This also must be a symmetrical characteristic.

If $W_1>W_2$, then
$$T_1=ET_2 \qquad (5)$$

If $W_2>W_1$, then
$$T_2=ET_1 \qquad (6)$$

If $W_1=W_2$, the relationship of $T_1$ and $T_2$ is not defined.

Consider now the case where wheel 24 has poor traction and is slipping. Then $W_1>W_2$ and $T_1<T_2$. The driving effort is proportional to $T_1+T_2$. If R is the radius of the wheels 24 and 26 and F is the total driving force due to the wheels 24 and 26, then:

$$F=\frac{1}{R}(T_1+T_2)$$

Applying Equation 5 gives:

$$F=\frac{T_1}{R}\left(1+\frac{1}{E}\right) \qquad (7)$$

This shows that the driving force depends on the torque applied to the wheel which is slipping faster, and on the efficiency of the differential gear box 12. A similar result is obtained if wheel 26 is slipping. ($W_2$ is greater than $W_1$.) Equation 7 shows that the efficiency of the differential is 100% (1.0), then $$F=\frac{2T_1}{R}$$

On the other hand, if the efficiency is very low, the unbalanced force on the driving wheels 24 and 26 makes the vehicle difficult to steer.

The bevel gears presently used in most differentials have inherently high efficiencies; allowing for bearing losses, these currently in use differentials are probably on the order of 90% efficiencies. Thus, when one wheel has poor traction, say on ice, or mud, the total driving force due to the action of both wheels is only a little greater than twice the tractive effort of the slipping wheel—2.1 times as much, if we assume 90% efficiency. The potentially greater effort of the non-slipping wheel is lost due to the near perfect torque balancing effect of the differential.

If however, a differential 12 is made which is only 50% efficient, the driving force becomes $$F=\frac{2T}{R}\left(1+\frac{1}{.5}\right)=\frac{3T}{R}$$

or three times the effort of the slipping wheel. This is a gain in tractive force of 43%.

The differential 12, which is of the "semi-locking" type puts the inefficiency into the conjugate action of the gears and pinions. The gears and pinions can be designed for a specified degree of inefficiency by designing for a predetermined amount of sliding action between the teeth of the pinion and its mating the face gear. A range of efficiency from approximately 15% to 90% may be obtained, although a range of efficiency of 40% to 75% is the most practical for most applications. To obtain a range of efficiency of 40% to 75%, the TA or thread angle of the pinion is designed in the range of 20° to 35°. As shown in FIGS. 2 and 3, it is possible to put as many as six sets 48 of pinions in mesh with the respective gears 54 and 56 for dynamic balance, wear and strength purposes.

Each individual pinion of each of the sets of pinions is located relative to the gear teeth that they respectively mate with so as to be located in the correct quadrant for proper coaction therewith. The gears 54 and 56, although being of opposite hand and different sizes, each have an equal number of teeth, thus maintaining the 1:−1 ratio relationships, the pinions 50 and 52 acting merely as direction reversing idlers. The pinion 52 and the gear 54 and the pinion 50 and the gear 56 do not necessarily have equal numbers of teeth; i.e., the pinions may have less teeth than the gears but the ratios of each pinion to its gear must be the same. In gearing of the type mentioned and discussed in the aforementioned patent, the efficiency of the gearing can be varied by changing this ratio, which affects the lead angle of the pinion. In the embodiment shown in FIGS. 1–3, the ratio of the pinions with the individual gears is 48/7, and the pinion lead angle or thread angle is approximately 20°. This combination results in an approximate "gear box" efficiency for the differential 12 of 50% to 60%. By changing the lead angle or thread angle, the design can be readily changed for greater or less efficiency depending upon the "semi-locking" characteristics desired for the differential.

The embodiment of the invention shown in FIGS. 4 through 6 has many similarities to the device depicted in FIGS. 1 through 3 and similar portions will be identified by similar reference numerals with the addition of the suffix $a$. Only the different portions of the device shall be discussed. The differential 12$a$ differs from the device shown in FIG. 1 in that each of the face gears 54$a$ and 56$a$ are of identical size, hand of teeth, and number of teeth. The pinion sets 48$a$ (two sets being shown) are mounted on the carrier plate 40$a$ and comprise pinions 50$a$ and 52$a$ coacting respectively with face gears 54$a$ and 56$a$, the pinions being mounted on individual shafts 60 and 62 which are disposed on the carrier plate 40$a$ in offset parallel relationship which provides parallel planes of rotation. The pinions 50$a$ and 52$a$ are coupled together by two spur gears 64 and 66 of identical size so that movement of pinion 50$a$ causes movement of pinion 52$a$ through the spur gears 64 and 66 and the shafts 62 and 60. The motion reversing aspects are shown by the arrows on FIG. 4, the spur gears 64 and 66 imparting to the differential the characteristics of the differential shown in FIG. 2 by the coaxially mounted pinion 50 and 52 which are of opposite leads cooperating with gears of opposite hand. It will be further noted, in the embodiments shown in FIGS. 4 through 6, that all of the pinions 50$a$–52$a$ are identical in size and hand as compared to the two different sizes and hands of the pinions 50 and 52 shown in FIGS. 1 through 3. Further, each of the pinions 50$a$ and 52$a$ are disposed in the correct driving quadrant for coaction with their respective gears. Dynamic balance is given by maintaining the sets 48$a$ in symmetrical relationship.

From the foregoing, it is seen that a semi-locking differential may be provided which is compact, rugged, has a minimum number of parts, where the semi-locking characteristics may be designed to suit, which may be used in differentials where substantial torques are involved since the strong gear teeth in their meshing relationship provide the desired "inefficiency," and which are of the type where dynamic balance is maintained by the use of a plurality of pinion sets. Although specific embodiments of the invention have been shown and described, it is with full awareness that many modifications thereof are possible. The invention, therefore, is not to be restricted except insofar as is necessitated by the prior art and by the spirit of the appended claims.

What is claimed as the invention is:

1. A device comprising first and second shaft means coaxially aligned with the end surfaces thereof in spaced relation, first and second face gear means mounted respectively on said first and second shaft means adjacent the end surfaces thereof, said face gear means being located with the active surfaces of each gear means facing a plane transverse to the axis of the shaft means and intermediate the ends thereof, carrier means adapted to be driven for rotative movement on an axis coincident with the axis of said first and second shaft means, at least two sets of pinion means spacedly mounted for rotative movement on and for rotative movement with said carrier means in co-operation with said first and second spaced face gear means, each of said sets of said pinion means comprising first and second pinions cooperable respectively with said first and second face gear means, said first and second pinions being mounted on axes which are in skew relationship to the axis of said first and second spaced gear means and said pinions having parallel planes of rotation, said first and second pinions each having a hand and each being located in the proper quadrant for that hand relative to its mating face gear means and in correct meshing relationship thereto to provide an opposite sense of rotation therebetween when viewed from the axis of rotation of the face gear means from the toothed side of the face gear means, coupling means for said first and second pinions to transmit power therebetween and thereby between said first and second face gear means.

2. The device set forth in claim 1 wherein said first and second pinions and said first and second face gear means are characterized as having a substantial sliding conjugate action whereby when there is relative rotary movement of said first shaft means to said second shaft means, said relative movement causing said first and second pinions to rotate about their axes, then the friction engendered by said sliding action urges a lessening of the relative rotative movement of said second face gear and shaft means to said first face gear and shaft means.

3. The device set forth in claim 2 wherein each of said first and second pinions have a thread angle in the range of 10° to 45° to provide a range of efficiency from approximately 15% to 90%.

4. The device set forth in claim 2 wherein each of said first and second pinions have a thread angle in the range of 20° to 35° to provide a range of efficiency from approximately 40% to 75%.

5. A device comprising first and second rotary means in coaxially aligned relationship, first and second face gear means mounted for movement respectively with said first and second rotary means with the active surfaces of each face gear means facing a plane transverse to the axis of the rotary means, third rotary means mounted to be rotated on an axis coincident with the axis of said first and second rotary means, first and second toothed pinion means spacedly mounted for rotative movement on and for rotative movement with said third rotary means in conjugate cooperation with said first and second spaced face gear means, said first and second pinion means each being mounted on an axis which is in skew relationship to the axis of said first and second spaced gear means and which have parallel planes of rotation, said first and second pinion means each being located in its proper quadrant relative to its mating face gear means in proper driving-driven relationship to afford an opposite sense of rotation therebetween when viewed from the axis of rotation of the face gear means from the toothed side thereof, coupling means for said first and second pinion means to transmit power therebetween and thereby between said first and second face gear means.

6. The device set forth in claim 5 wherein the conjugate action of said first and second toothed pinion means and said first and second face gear means is characterized as being of a substantial sliding nature so as to absorb power whereby when there is relative rotary movement of said first rotary means to said second rotary means, said relative movement causing rotative movement of said first pinion means on its axis on said third rotary means and said coupling means between said first and second pinion means in turn causing rotative movement of said second pinion means on its axis on said third rotary means, then the friction engendered by said sliding nature of the conjugate action tends to urge a lessening of the relative rotative movement of said second face gear means and second rotary means to said first face gear means and first rotary means.

7. The device set forth in claim 6 wherein the third rotary means is characterized as having portions located intermediate said first and second gear means and when driven by third gear means tending, when there is no relative motion of said first and second rotary means, to impart substantially equal loads to said first and second pinion means mounted thereon which in turn tends to impart substantially equal loads to said first and second face gear means, said first and second face gear means being characterized as having a one to one ratio relationship.

8. The device set forth in claim 7 wherein said coupling means is a pinion shaft means coaxially mounting said first and second pinion means thereon with no relative rotation therebetween, said pinion shaft means being mounted on said third rotary means with the axis thereof in a plane substantially transverse to the axis of said first and second face gear means and in skew relation thereto, said first and second face gear means being of different diameters and the teeth thereon being of opposite hands, said first and second pinion means each being of opposite hand and each being generally cylindrical in configuration and having a constant lead.

9. The device set forth in claim 7 wherein said coupling means comprises first and second pinion shaft means in offset parallel relation respectively mounting said first and second pinion means on said third rotary means and fourth and fifth gear means mounted respectively on said first and second pinion shaft means in meshing relationship to transmit motion therebetween.

10. The device set forth in claim 9 wherein said first and second face gear means are of the same diameter and hand of teeth, said first and second pinion means are of the same configuration and hand of teeth, and said fourth and fifth gear means are of the same size and configuration.

11. The device set forth in claim 7 wherein there is a plurality of sets of first and second pinion means mounted on said third rotary member, said sets of rotary members being symmetrically arranged about the axis of said third rotary member in symmetrical relationship to maintain dynamic balance between said first and second gear means.

12. The device set forth in claim 11 wherein each of said pinion means of each set of pinion means has a thread angle in the range of 10° to 45° to provide a range of efficiency, when there is relative motion between the first and second rotary means, of approximately 15% to 90%.

13. A differential comprising first and second shaft means coaxially aligned with the end surfaces thereof in spaced opposed relation, first and second face gear means mounted respectively on said first and second shaft means adjacent the end surfaces thereof for rotative movement therewith, said face gear means being located on the respective shaft means in generally opposing relationship to each other and facing a plane transverse to the axis of the shaft means and intermediate the spaced ends thereof, carrier means having means for supporting each of said shaft means for relative rotation thereto and having a toothed surface adapted to be driven by power input means, said carrier means being rotatable on an axis coincident with the axis of said first and second shaft means and having portions thereof located in the area intermediate said first and second face gear means, at least two sets of pinion means spacedly mounted on said carrier means for rotative movement to and with said carrier means, each of said sets of pinion means being characterized as being comprised of at least first and second pinions, each having a spiral angle in the range of 15° to 45° in meshing conjugate action respectively with said first and second spaced face gear means in a manner to provide a sliding action therebetween, said first and second pinions of each set of pinion means being mounted on an axis, each of which is in skew relationship to the axis of said first and second spaced gear means, the planes of rotation of the first and second pinions of each set of pinion means being parallel with each other, said first and second pinions each being located in its proper quadrant relative to its mating face gear means in proper driving-driven relationship to afford an opposite sense of rotation therebetween when viewed from the axis of rotation of the face gear means from the toothed side thereof, coupling means for said first and second pinions of each set of pinions to transmit motion therebetween and thereby between said first and second face gears, said first and second face gear means and said sets of pinion means having respective ratios to provide a one to one relationship between said first and second face gear means, said carrier means when rotatably driven by said power input means tending to urge said first and second face gear means in a first rotative direction at similar speeds when the angular restraints on said first and second shaft means are equal while permitting a differential in motions of said first and second shaft means when the angular restraints thereon are unequal, the sliding nature of the conjugate action of said sets of pinions with said first and second face gear means, when there is relative rotary movement of said first shaft means to said second shaft means and rotative movement of said first pinion and said second pinion about their axes, urges a lessening of the relative rotative movement of said second face gear and shaft means to said second face gear and shaft means to provide a differential which will tend to lessen relative motion between said first and second shaft means.

References Cited in the file of this patent

UNITED STATES PATENTS

| | | |
|---|---|---|
| 1,213,258 | Reddig | Jan. 23, 1917 |
| 2,522,193 | Randall | Sept. 12, 1950 |
| 2,628,508 | Gleasman | Feb. 17, 1953 |
| 2,666,343 | Casa-Massa | Jan. 19, 1954 |
| 2,775,142 | Brensike et al. | Dec. 25, 1956 |
| 2,823,559 | Ransom | Feb. 18, 1958 |
| 2,898,778 | Ransom | Aug. 11, 1959 |